United States Patent [19]
Baker et al.

[11] Patent Number: 4,586,035
[45] Date of Patent: Apr. 29, 1986

[54] DISPLAY TERMINAL WITH A CURSOR RESPONSIVE VIRTUAL DISTRIBUTED MENU

[75] Inventors: David C. Baker; Kathryn A. Bohrer; Gregory A. Flurry, all of Austin, Tex.

[73] Assignee: International Business Machines Corporation, Armonk, N.Y.

[21] Appl. No.: 584,686

[22] Filed: Feb. 29, 1984

[51] Int. Cl.$^4$ ............................................. G09G 1/00
[52] U.S. Cl. ............................. 340/712; 340/365 VL; 340/723; 340/706; 178/18
[58] Field of Search ............... 340/706, 709, 712, 721, 340/723, 711, 365 VL; 178/18, 19, 20

[56] References Cited

U.S. PATENT DOCUMENTS

| | | | |
|---|---|---|---|
| 3,757,037 | 9/1973 | Bialek | 340/723 |
| 4,274,093 | 6/1981 | Sudge | 340/712 |
| 4,278,973 | 7/1981 | Hughes et al. | 340/711 |
| 4,329,684 | 5/1982 | Monteath et al. | |
| 4,374,381 | 2/1983 | Ng et al. | |
| 4,413,314 | 11/1983 | Slater et al. | 340/712 |
| 4,463,442 | 7/1984 | Dachowski et al. | |

OTHER PUBLICATIONS

"Virtual Terminal Management in a Multiple Process Environment", K. A. Lantz et al, Proceedings of The Seventh Symposium on Operating Systems Principles, 1979, p. 86.
"BRUWIN: An Adaptable Design Strategy for Window Manager/Virtual Terminal Systems", N. Meyrowitz et al, Proceedings of The Eighth Symposium on Operating Systems Principles, 1981, p. 180.
"The Smalltalk Environment", Larry Tesler, *Byte*, vol. 6, No. 8, Aug. 1981, p. 90.
"The Lisa Computer System", Gregg Williams, *Byte*, Feb. 1983.

*Primary Examiner*—Gerald L. Brigance
*Attorney, Agent, or Firm*—J. B. Kraft

[57] ABSTRACT

An interactive display terminal of the multiple overlapping window type is provided. Each of the windows is smaller in dimension than the overall display screen. One or more of the windows have an associated virtual distributed menu which is made up of a plurality of menu items respectively distributed about the periphery of the associated window but not displayed during normal operations. Cursor means and means for moving the cursor are also provided. The display terminal further includes apparatus which in response to the movement of the cursor across a selected region in a window periphery will effect the display of a selected menu item associated with the particular selected region. The overlapping windows are preferably rectangular in shape and the selected regions are adjacent to corners of the periphery. The menu items are distributed so as to be positioned adjacent to the respective region across which the cursor movement will result in the item display.

12 Claims, 12 Drawing Figures

PRESENT DISPLAY

PRESENT DISPLAY

PRESENT DISPLAY

DISPLAY TERMINAL WITH A CURSOR RESPONSIVE VIRTUAL DISTRIBUTED MENU

DESCRIPTION

1. Technical Field

The present invention relates to interactive display terminals and in particular to interactive display terminals containing a plurality of windows for use in text processing and office systems in general.

2. Background Art

In the past decade, the use of data processor controlled interactive display terminals has revolutionized text processing and opened new aspects of personal computer technology. In its traditional practice, text processor display terminals permit the operator to add to or delete data from displayed text, to reformat the displayed text and to move data from one portion of the text to the other. When the text processing or data reformatting is completed to the operator's satisfaction, final text or data may be stored on a diskette, communicated or printed-out. Initially, the operator had the capability of displaying and working with only one document at a time. However, recent developments in the technology, as exemplified by the following articles "Virtual Terminal Management in a Multiple Process Environment", K. A. Lantz et al, *Proceedings of The Seventh Symposium on Operating Systems Principles,* 1979, page 86; "BRUWIN: An Adaptable Design Strategy for Window Manager/Virtual Terminal Systems", N. Meyrowitz et al, *Proceedings of the Eighth Symposium on Operating Systems Principles,* 1981, page 180; and "The Smalltalk Environment", Larry Tesler, *Byte,* Vol. 6, No. 8, August 1981, page 90 have provided the operator with the capability of displaying the contents of several documents or records on a display terminal screen at the same time. The contents are displayed in a plurality of often overlapping windows each displaying the contents of a particular document or computer file. This multiple windowed terminal avoids the need for the operator to switch from document to document or computer file to computer file each of which occupy the entire screen as in normal editing operation when the operator is attempting to "cut and paste" and transfer information from one document or file to another to thereby reformat the document or file.

In the present state of this technology, this need for switching from screen to screen is avoided through the use of a plurality of overlapping windows each of which contains a different information set. The contents of the information or subject matter displayed in the window may be transferred from one window to another. Also, as needed, respective windows can be moved about the screen to eliminate the overlap so as to expose a particular one of the windows in its entirety as required. From a human factors view point, the display screen is thus structured to resemble a "real-life" desk top situation when an editor is correlating information from a group of overlapping documents on his desk by transferring, and cut and pasting.

The "real-life" desk top editor generally knows what he can manually do. He can cut, he can paste, he can block or scratch out, or he can insert and write in manually. However, the interactive terminal operator doesn't quite have the same ready access to his manipulative functions. He has to have the display tell him what he can do if he chooses, i.e., by way of a menu, and the means to make a particular choice of items from that menu.

An existing approach towards menu display in multiple window terminal has been to designate an area of the display screen, i.e., along the bottom of the screen or the side of the screen, for menu display and to bring the whole menu up into this designated area whenever a choice or change in function with respect to any of the windows is required. With this approach, a portion of the screen large enough to display a menu often involving many choices has to be utilized at least during the periods when the menu choices are being made. This results in the loss of what can be a substantial portion of an already very crowded small display screen. Another approach involves the designation and in effect dedication of regions of the screen for certain functions, e.g., the continual display of a scroll bar on the screen so that when the operator desires to scroll the contents of a particular window associated with the scroll bar, the scroll function may be activated by contacting the scroll bar either with the cursor or a light pen or other suitable contacting device. This arrangement is exemplified by the figure on page 37 of the article "The Lisa Computer System," *Byte* magazine, February 1983, Greg Williams. Here again, the implementation of such a scroll bar function results in the exclusion of such a dedicated region from the display throughout the editing operations.

The present invention maximizes the screen area available to the operator for document and data display in the windows both during the functional operations of the display as well as during selection of menu items.

By way of background, U.S. Pat. Nos. 4,329,684 and 4,375,381 are representative of display terminal presenting selection menus to the operator. However, neither reference is directed to displays having multiple windows. In this connection, previously referenced articles are believed to be more representative of the closest prior art.

DISCLOSURE OF THE INVENTION

The present invention minimizes a screen area required for menu selection purposes in an interactive display terminal made up of a display screen having at least one window of lesser dimensions than that of the display screen and displaying subject matter different from that displayed on the remainder of the screen. This is accomplished through the inclusion in the display terminal screen of a virtual menu comprising a plurality of items respectively distributed about the periphery of one of the windows but not displayed during normal operations. The display terminal contains cursor means on said screen and means for moving the cursor. In addition, the terminal has means responsive to the movement of the cursor across selected regions in a window periphery for displaying selected menu items respectively associated with said peripheral regions. Thus, by moving the cursor across a preselected portion or region of a window periphery, the menu item representative of a particular function to be performed on the data within said window becomes displayed. With this arrangement, all of the items in the menu remain substantially virtual, i.e., not displayed during the normal operations of the interactive terminal. Further, there are substantially no dedicated portions of operational screen which cannot be used for display purposes during functional operations; the periphery of each window merely performs its normal function of defining the window. It is only when a selected region of this ordinary periphery is crossed by the cursor that an associated menu item becomes displayed.

For best results, the selected regions in the window periphery should be adjacent to the corners of the window. With such an arrangement, the ordinary rectangular window periphery can accommodate up to eight of such regions with two regions being respectively positioned on either side of each of the four rectangular corners. This still leaves a major portion in the centers of each of the four sides of rectangular window open so that the cursor may be moved into and out of the window through the central region without crossing any of the selectable corner regions.

In addition it is very desirable to have the respective menu items positioned adjacent to their respective associated periphery regions the crossing of which activates the display of the respective menu item. With such an arrangement, the operator can quickly become familiar with and learn the menu items or functions displayed as a result of moving the cursor across the respective peripheral regions. Initially, the operator may wish to utilize some sort of template or guide advising him of the hidden or virtual menu items associated with each of the peripheral regions. However, after a short operational period, he should become familiar with the menu item associations.

BRIEF DESCRIPTION OF DRAWINGS

Referring now to the drawings, wherein a preferred embodiment of the invention is illustrated, and wherein like reference numerals are used throughout to designate like parts.

BEST MODE FOR CARRYING OUT THE INVENTION

Figure 1:
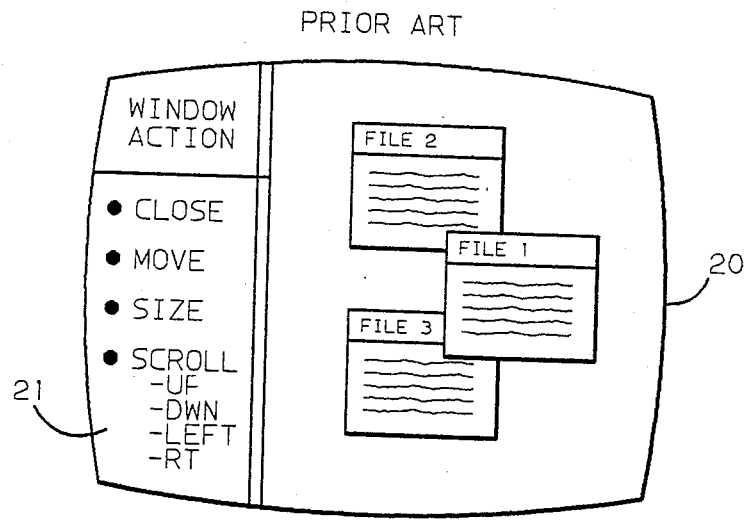
FIG. 1 is a diagrammatic representation of a prior art display screen.

In considering the best mode for carrying out the present invention, we wish to initially indicate the differences between the display screen produced through the apparatus of the present invention over typical prior art display screens as described in the previously referenced prior art articles. As shown in FIG. 1, a typical prior art display having overlapping windows comprises screen 20 having three overlapping windows designated by files 1, 2 and 3 as well as a menu 21 from which the operator may select the specified action to be taken with respect to the contents of any one of file 1, 2 and 3 windows. The appropriate action may be selected from the menu by activating one of the listed functions in any conventional way, e.g., through a mouse, or keyboard driven cursor or by some sort of touch mechanism such as a light pen or touch screen.

Figure 2:
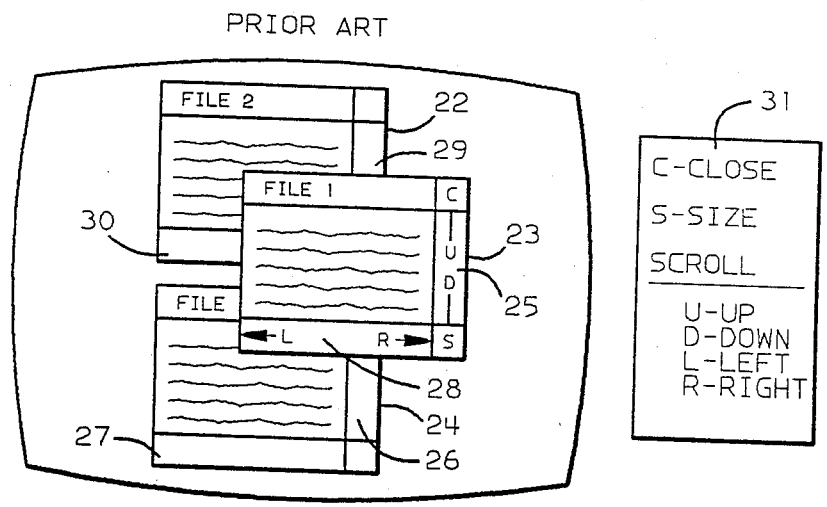
FIG. 2 is a diagrammatic representation of an alternate prior art display screen.

While the space occupied by the menu may have been somewhat exaggerated for diagrammatic purposes, nevertheless, the menu must occupy a substantial portion of dedicated screen space which might otherwise have been occupied by data windows. The alternative prior art screen arrangement having overlapping windows being designated by files 1, 2 and 3 as shown in FIG. 2, has eliminated the screen menu. Instead, it has designated areas at the edges of the respective windows 22, 23 and 24, as represented by dedicated areas, e.g., areas 25, 26, 27, 28, 29 and 30, for selection purposes. In addition, it has provided a legend which may be in the form of a template 31 that may be mounted anywhere on the display associated with the screen. The legend indicates that when a cursor or other activating means is moved into a respective one of the areas designated C, S, U, D, L and R, respective functions may be activated in connection with the associated window. However, here again, the areas designated 25–30 along the respective edges of the three overlapping windows 22–24 remain on display and are thus dedicated. Consequently, the area of each window remaining for the display of the subject matter within the window becomes somewhat constricted.

Figure 3:
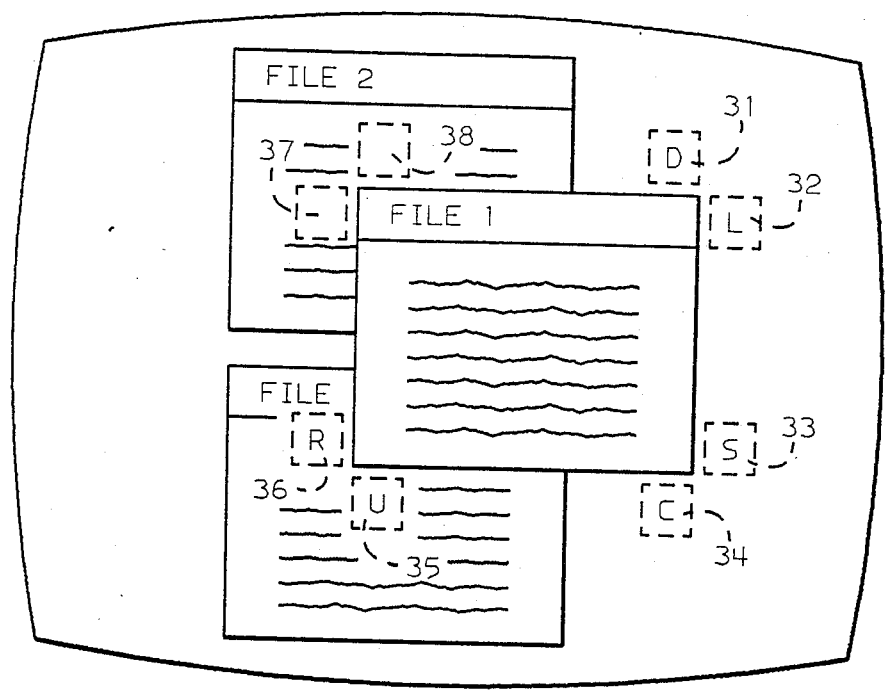
FIG. 3 is a diagrammatic representation of a display screen in accordance with the present invention wherein all of the menu items are in their virtual or undisplayed state.

In contrast to the prior art display systems as illustrated in FIGS. 1 and 2, in the display system of the present invention as illustrated generally in FIG. 3, during the operational or functional periods of the display, all of the menu items designated 31, 32, 33, 34, 35, 36, 37 and 38 associated with the window designated file 1 remain as virtual items distributed about the periphery of the file 1 window. It should be noted that the windows file 2 and file 3 have similar menus of distributed virtual items. In other words, menu items 31–38 as indicated by the dotted line remain undisplayed during the functional operation which may be carried out on the contents of the file 1 window.

Figure 4:
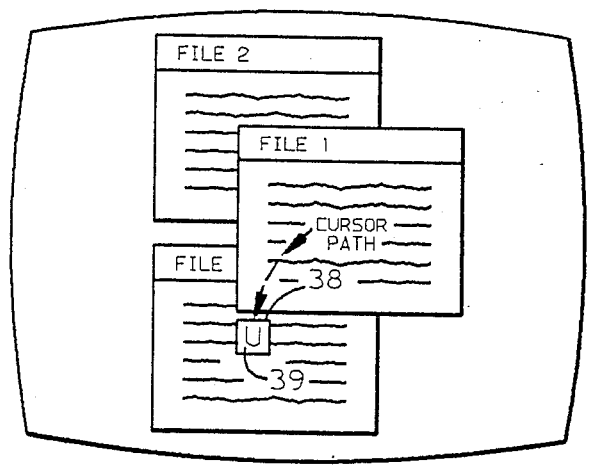
FIG. 4 is a diagrammatic representation of the display screen of FIG. 3 wherein one of the items on the virtual distributed menu has been activated and thus displayed.

When it is desired to activate and thus display a particular item from the distributed menu, then, FIG. 4, the cursor is moved along the path which crosses a peripheral region 38 resulting in a display of a menu item 39, U ↑. The procedure by which a particular menu item becomes activated will be explained hereinafter in greater detail. However, it is seen that the menu items may be activated one at a time as their display is needed by crossing a particular region, e.g., 38 of periphery 40 adjacent to the item 39 of the menu to be activated. All of the other distributed menu items remain undisplayed. The selection and display of menu item 39 indicates that the display window, file 1 may be scrolled upwards as required.

Before proceeding with a description of the apparatus and procedure involved in the present invention, functional operation of the invention will be described with respect to FIG. 8. A periphery 41 defines a window 42 which, let us assume, is equivalent to the file 1 window shown in FIGS. 3 and 4. Distributed around periphery 41 are eight menu items, respectively designated 43–50. Respectively adjacent to each of items 43–50 are eight regions or portions, 51–58 of periphery 41. As indicated by the dotted lines, menu items 43–50 are not displayed but remain virtual or invisible during the normal functional operation of window 42. If the operator desires to activate one of the menu items, he moves a cursor (not shown) in the manner described with respect to FIG. 4 so that the cursor crosses one of the periphery regions 51–58. This will activate the display of the respective menu item 43–50 adjacent to the cross peripheral region 51–58. As a result, as indicated in FIG. 4, the adjacent menu item becomes displayed while the other seven menu items remain virtual. For convenience in operation, the regions 51–58 (shown in bold lines) are arranged in pairs on either side of the four corners of rectangular window 41.

It should be noted that since menu items 43–50 are undisplayed during normal operations, the particular window or display will not normally indicate to the operator which of regions 51–58 would have to be crossed to activate a respective item 43–50. Consequently, the operator must initially know which menu items are adjacent to the respective peripheral regions. At first, the operator may use some sort of template or other learning aid outside of the screen to learn the relationship of peripheral regions to menu items. However, because of the expedient of displaying the particular menu item adjacent to and immediately upon the crossing of a respective selected peripheral region 51–58, the operator will soon learn the respective relationships of menu items to cross regions. In addition, with the limitation of regions 51–58 to the corners of window 41, an operator who wishes to cross into and out of a window without activating a menu item has large regions such as peripheral regions 59 and 60 in the central portions of their respective sides of the window periphery 41 through which to exit and enter upon window 42.

Figure 5:
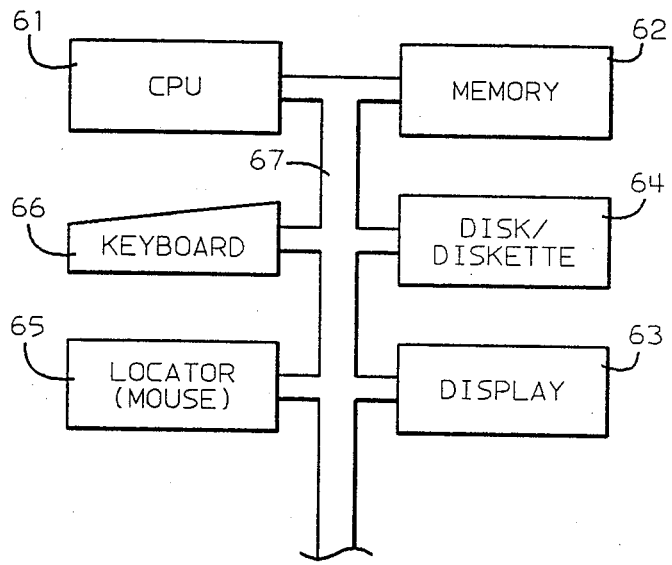
FIG. 5 is a generalized diagrammatic embodiment of the conventional data processing hardware which may be utilized in the practice of the present invention.

Commencing with FIGS. 5 and 6, the procedure in accordance with the present invention will now be described. The present invention may be implemented in a conventional data processing system generally shown in FIG. 5. The CPU 61 is supported by the system memory 62 in which all of the application programming is stored. The CPU 61 in combination with the memory 62 controls the display unit 63. The system has supplementary disk/diskette storage 64. The present invention is implemented through the movement of a cursor on the display screen. The cursor may be controlled by any conventional cursor locator means 65 such as a mouse or some form of cursor moving pen or panel or the cursor may be controlled through the system keyboard 66. The elements in the system are interconnected over a system bus 60.

Figure 6:
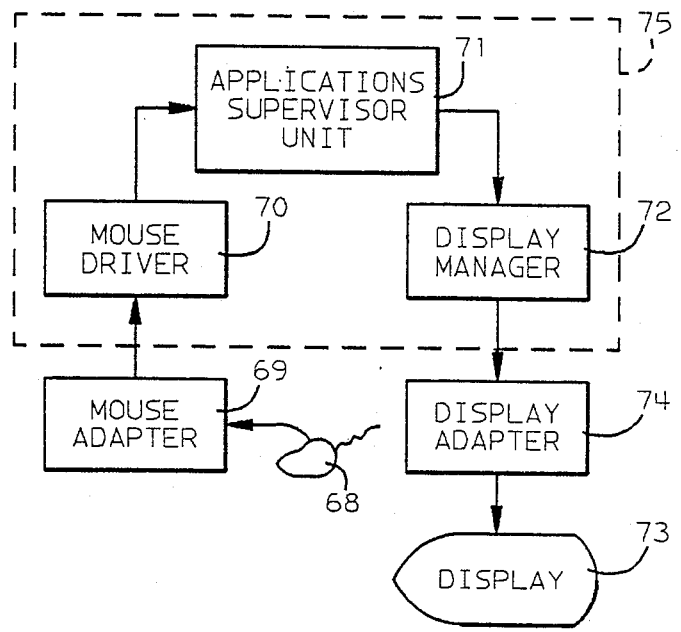
FIG. 6 is a diagrammatic representation of a data processing display system which may be used to practice the present invention.
Figure 7:
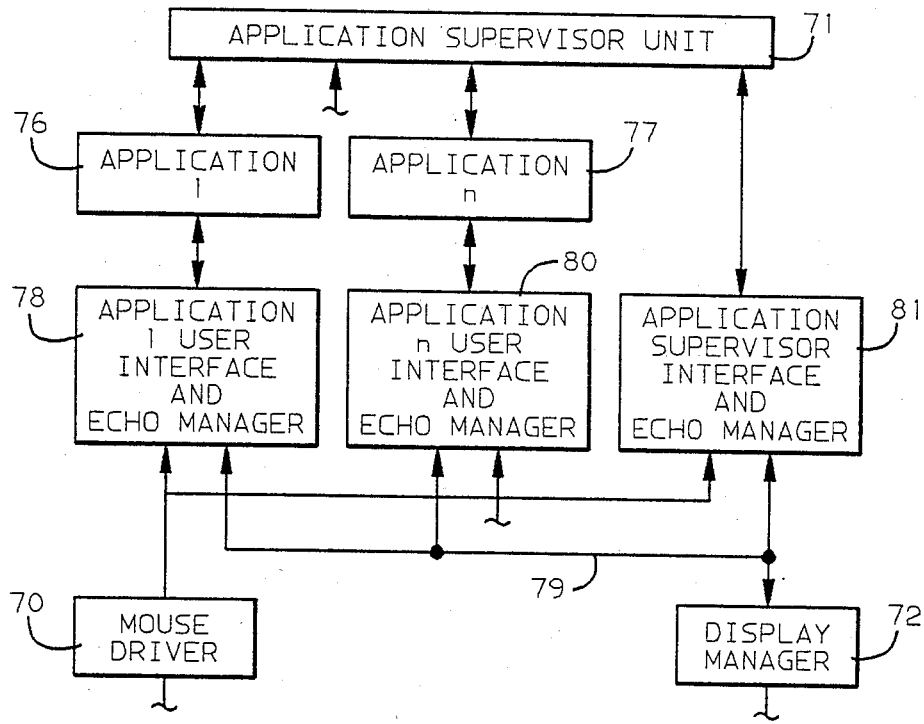
FIG. 7 shows the combination of logic units which participate in the practice of the present invention.

The system logic and apparatus carrying out the present invention are shown in FIGS. 6 and 7. With respect to FIG. 6, in this preferred embodiment, the cursor movement will be provided through a conventional mouse 68 which is connected to data processing display system through a mouse adapter 69 which has the conventional apparatus and logic required to interface the mouse operations to the particular data processing display system implementing the present invention. The mouse driver unit 70 which is part of the data processing display system of the present invention a portion of which is bracketed, 75. The mouse driver 70 serves the function of converting the signals received from the mouse adapter to data which is operable within the present system. The mouse drivers are conventional in interfacing the input from an external mouse into operable systems data. At this point, it should be noted that the operations involved in implementing the present invention which will be hereinafter described may be carried out in a conventional system such as one in which CPU 61 of FIG. 5 may be a conventional microprocessor such as Intel 8088 supported by 256K units of memory, 62 or a reduced instruction set architecture supported by 512K bytes of memory. The routines and logical operations required for the present invention are carried out in the application supervisor unit 71 which will be subsequently described with respect to FIG. 7. Changes to the display as a result of the applications operation are controlled by a conventional display manager 72 which communicates with a display unit 73 through a display adapter 74 which adapts or converts the commands of the display manager to signals which are utilizable in the selected specific display 73.

The routines implementing the present invention which are stored in memory 62 and carried out under the direction of application supervisor unit 71 which is also stored in memory 62 under the control of CPU 61 will now be described in detail with respect to FIG. 7. Assuming a display such as that shown in FIG. 4 with a plurality of windows, e.g., file 1, file 2 and file 3 in which a plurality of applications are taking place. The applications designated application "1", 76 through application "n", 77 are each being respectively carried out in a corresponding window file 1, 2 or 3 in FIG. 4. Since the cursor movement to be conducted in the procedure of the present invention is controlled from the user mouse through mouse driver 70, application 1 interfaces with the user through a standard interface, 78. The routines to be subsequently described for coordinating cursor movement to the selected display of virtual menu item is part of this application 1 user interface 78. The interface 78 also contains a conventional echo manager which directly conveys the cursor movements together with the resulting display changes, e.g., the display of a particular menu item to the display manager 72 over bus 79 whereupon the display manager may directly cause these cursor movement and display changes to be displayed on display 73. Each application, as represented by application "n", 77, has its own user interface and echo manager 80 which may effect similar input to its associated window, file 1, 2 or 3 resulting from suitable input whether it be from a mouse driver, keyboard or light pen. The application supervisor unit 71 coordinates and multiplexes these various individual window operations and also exercises control over the display manager through the application supervisor interface and echo manager unit 81.

With this background let us now consider how the routine stored in application 1 user interface and echo manager unit 78 functions to determine when cursor movements provided from mouse 68 (FIG. 6) through mouse adapter 69 and mouse driver 70 result in the display of selected items from the virtual distributed menu. The routines to be described will track the movements of a cursor with respect to one of the windows and determine when the movement of the cursor should result in the display of a menu item. With reference to FIG. 9, window 42 of FIG. 8 and the area surrounding the periphery 41 of this window have been subdivided into orthogonal areas whereby the movement of cursor 81 through the various orthogonal areas may be tracked and the resultant menu items displayed when activated. The routine for tracking the cursor with respect to the various orthogonal areas shown in FIG. 9 is subsequently set forth as the INSIDE routine.

Figure 8:
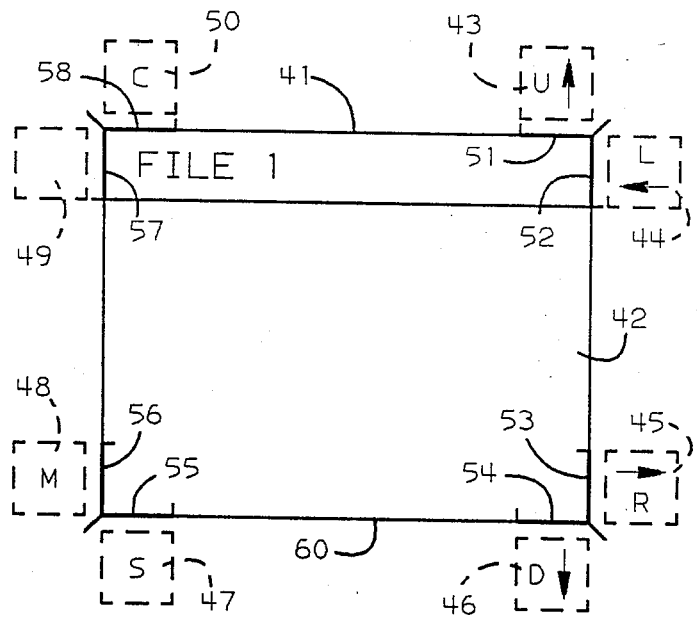
FIG. 8 is a diagrammatic representation of one window in a display screen of the present invention such as that shown in FIG. 3 illustrating the disposition of the virtual or undisplayed menu items with respect to the regions in the periphery of the window the crossing of which by the cursor results in a selected item becoming displayed.
Figure 9:
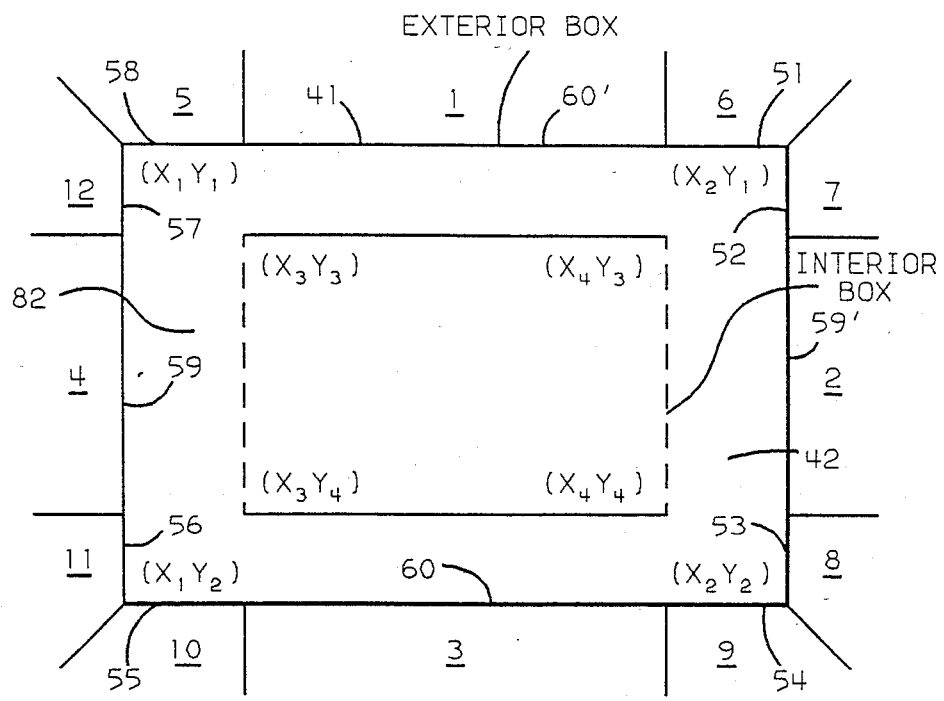
FIG. 9 is a diagrammatic illustration of the screen window of FIG. 8 subdivided into coordinate area required by the procedures of a cursor position determining routine.

As previously indicated with respect to FIG. 8, the periphery 41 which is also referred to as the exterior box in FIG. 9 has eight selected peripheral regions 51-58 the crossing of which by cursor 82 from within the exterior box defined by periphery 41 will result in the display of a menu item associated with the respective region. In the orthogonal arrangement shown in FIG. 9, each of peripheral regions 51-58 has adjacent and exterior thereto a respective one of eight areas: 6, 7, 8, 9, 10, 11, 12 and 5. A primary purpose of the INSIDE routine listed subsequently is to determine when cursor 82 crosses periphery 41 from within window 42 and enters a respective one of exterior regions 5-12. In making these determinations, routines utilize the exterior box enclosed by rectangular periphery 41 and defined by diagonal rectangular coordinate (X1, Y1) and (X2, Y2). In addition, the routine utilizes an interior rectangular box indicated in FIG. 9 and defined by diagonal coordinates (X3, Y3) and (X4, Y4). It should be noted that this interior box is formed by the orthogonal projection of periphery central region pairs 59 and 59' and 60 and 60' into window 42. In other words, if cursor 82 is moved from within the interior box along any X or Y axis, it has a path whereby it may pass from within window 42 across one of the central regions 59, 59', 60 and 60' into either areas 1, 2, 3 or 4 without the resultant display of any menu item.

With the window 42 arranged as shown in FIG. 9, every time the cursor 82 is moved to a new position, the INSIDE routine which follows is activated and the position of the cursor analyzed in accordance with the INSIDE routine which follows. The routine is set forth in PLI-like pseudo code.

```
INSIDE: procedure (X, Y, X1, Y1, X2, Y2)
returns(integer)
! perform a box test on exterior box
IF ! x is to the left of x1
X < X1
THEN ! its outside the exterior so find out
!! where
GOTO LEFT;
IF ! x is to the right of x2
X > X2
THEN ! its outside the exterior so find out
!! where
GOTO RIGHT;
IF ! y is to above y1
Y < Y1
THEN ! its outside the exterior so find out
!! where
GOTO ABOVE;
IF ! y is to below y2
Y > Y2
THEN ! its outside the exterior so find out
!! where
GOTO BELOW;
! normal case, quick exit after simple box test
!! reveals cursor still inside of screen
return(0);
LEFT:
! location is outside of and to the left of
!! exterior box
IF ! the point is also above the diagonal
Y >(Y1+X1−X)
THEN ! report the fact that an event has been
!! detected
RETURN(5);
IF ! the point is also below the lower left
!! diagonal
Y <(Y2−X2+X)
THEN ! report the fact that an event has been
!! detected
RETURN(10);
IF ! the point is above and left of box and
!! below the upper left diagonal
Y > Y3
THEN ! report the fact that an event has been
!! detected
RETURN(12);
ELSE IF ! the point is below and left of box and
!! above the lower left diagonal
Y < Y4
THEN ! report the fact that an event has
!! been detected
RETURN(11);
ELSE ! report the fact that an event has
!! been detected
RETURN(4);
RIGHT:
! location is outside of and to the right of !!
exterior box
IF ! the point is also above the diagonal
Y >(Y1+X1−X)
THEN ! report the fact that an event has been
!! detected
RETURN(6);
IF ! the point is also below the lower right
!! diagonal
Y <(Y2−X2+X)
THEN ! report the fact that an event has been
!! detected
RETURN(9);
IF ! the point is above and right of box and
!! below the upper right diagonal
Y > Y3
THEN ! report the fact that an event has been
!! detected
RETURN(7);
ELSE IF ! the point is below and right of box
!! and above the lower right diagonal
Y < Y4
THEN ! report the fact that an event has
!! been detected
RETURN(8);
ELSE ! normal exit from the screen has been
!! detected
RETURN(2);
ABOVE:
! location is directly above the exterior box so
!! check interior box
IF ! point is to the left of the interior box
X < X3
THEN ! report the fact that an event has been
!! detected
RETURN(5);
IF ! point is to the right of the interior box
X > X4
THEN ! report the fact that an event has been
!! detected
RETURN(6);
! normal exit from screen has been detected
RETURN(1);
BELOW:
! location is directly below the exterior box so
!! check interior box
IF ! point is to the left of the interior box
X < X3
THEN ! report the fact that an event has been
```

```
-continued
!! detected
RETURN(10);
IF ! point is to the right of the interior box
X > X4
THEN ! report the fact that an event has been
!! detected
RETURN(9);
! normal exit from screen has been detected
RETURN(3);
END PROCEDURE INSIDE;
```

Now that we have seen how the INSIDE routine operates to determine which area the cursor is in after the X, Y delta's (Δ's) to new location are received in the application 1 user interface and echo manager block 78 of FIG. 7, we will now see how this application 1 user interface and echo manager uses this information to determine what is to be displayed. In the following description with reference to the flow chart, FIG. 10, describing the USER INTERFACE routine carried out in unit 78 of FIG. 7, whenever there is a step involving something which is to be displayed, i.e., echoed to the display, it will be understood that the instructions for such a step are echoed from the application user interface 78 over bus 79 to the display manager 72 which then implements what is to be displayed on the display in the conventional manner.

Figure 10:
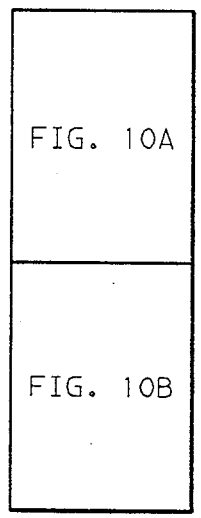
FIGS. 10, 10A and 10B are a flow chart showing the coordination of the USER INTERFACE routine and the INSIDE routine to determine which virtual menu items are to be displayed after particular cursor movements.
Figure 10A:
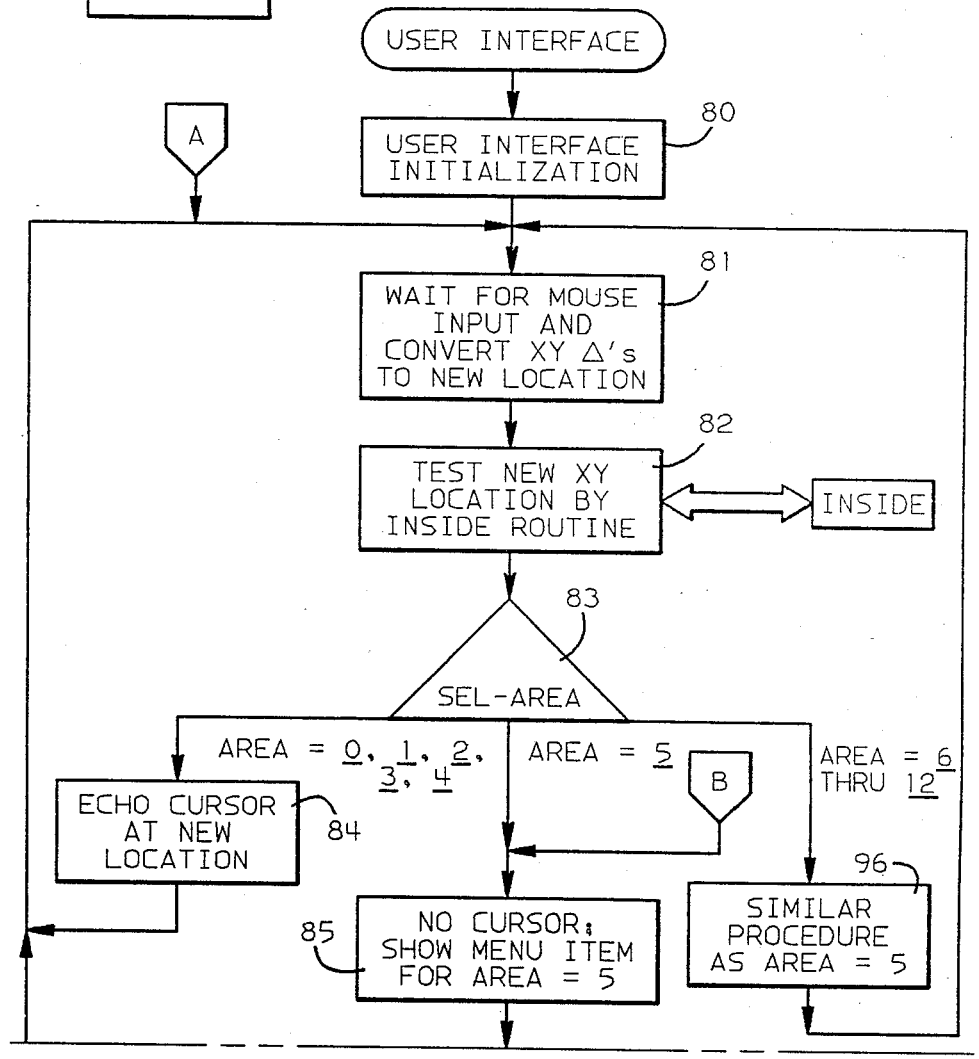
Figure 10B:
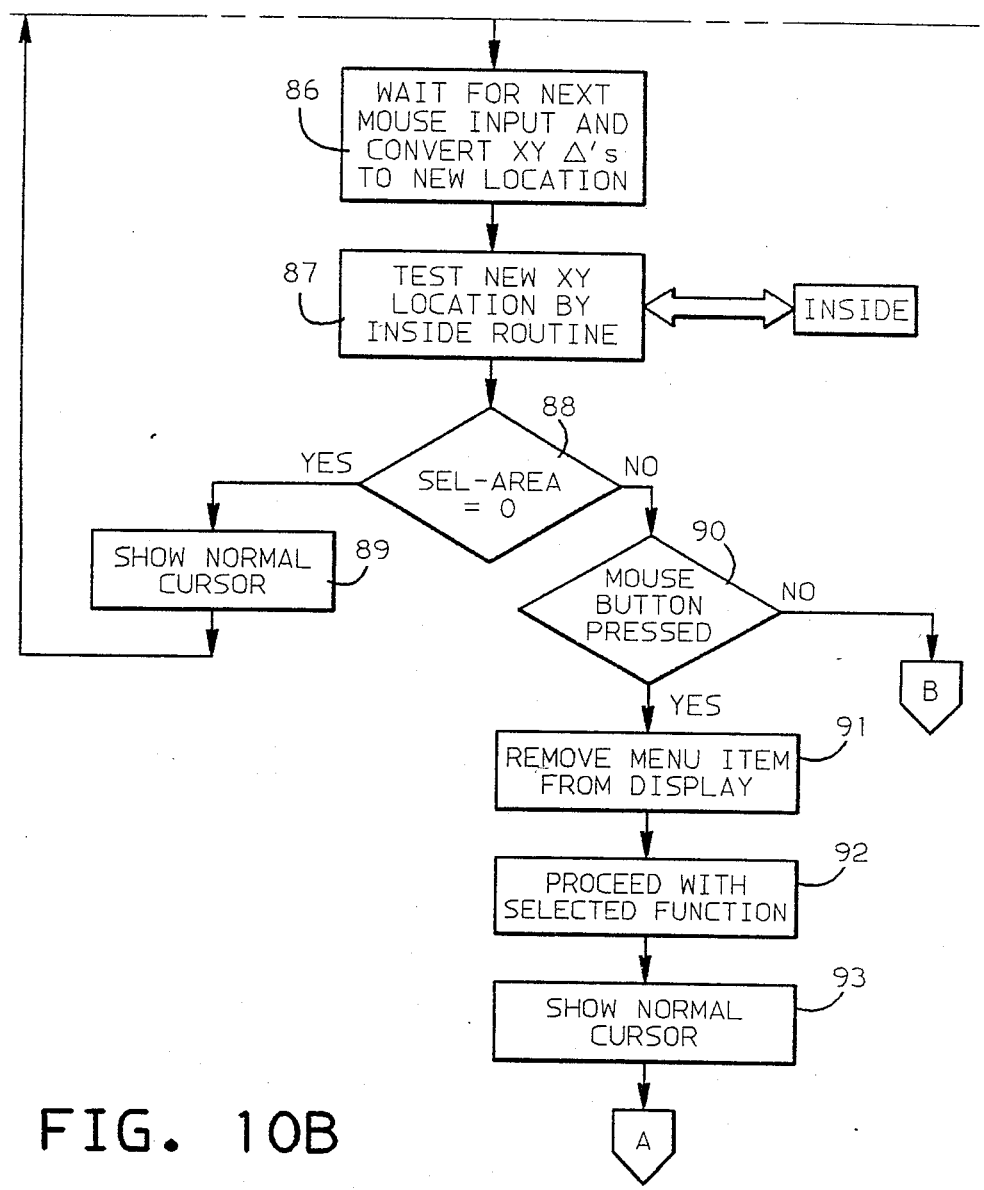

Now referring to FIG. 10, USER INTERFACE routine is initialized, step 80. The operator input from the mouse is received through the mouse driver 70 (FIG. 7) and the change in the X, Y coordinates is converted to the new location on the display, step 81. Next, step 82, the INSIDE routine which has been previously described is called and determines whether the cursor has crossed periphery 41 of the exterior box (FIG. 9) into an area 1-12. In Sel_Area, 83, a determination is made based upon the location of the cursor in one of the areas 1-12. (Area=0 means that the cursor has not crossed into one of the 12 areas and is still either on the periphery or within the limits of the exterior block or window.) If it is determined that the Area=0-4, i.e., the cursor is not in an area having an associated menu item to be displayed, then, step 84, the new cursor location is echoed to the display manager 72 (FIG. 7) and the procedure is returned to step 81.

If in the Sel_Area, step 83, the Area=5-12, i.e., an area having an associated virtual menu item, then we will follow the procedure commencing with step 85 for Area=5 as an example with the understanding as indicated in step 96 that the subsequent procedure for Area=6-12 will be the same as that now to be described with respect to Area=5. Continuing then with the procedure for Area=5, step 85, no cursor will be displayed; instead, the appropriate virtual menu item associated with Area=5 will now be displayed. For purposes of this example, the menu item thus displayed will be MOVE SCREEN. At this point, a safeguard is built into the system to insure that the operator truly intended to cross into Area=5 and thus bring up the MOVE SCREEN menu item. Accordingly, step 86, next mouse input is waited for and converted to the new location. Again, step 87, INSIDE routine described above is called upon and determines this next new X, Y location. In the Sel_Area decision step 88. If Sel_Area=0, then the operator has moved the cursor back from Area 5 to within the limits of window parameter 41 (FIG. 9), and step 89, the normal cursor is again displayed at this next new location, after which the procedure is returned to step 81. On the other hand, if the cursor is still within Area 5, then the procedure awaits the user to press the appropriate mouse button so that the function represented by the MOVE SCREEN menu item may now be implemented within window 42. Decision step 90 awaits the pressed button signal by returning the system to step 85 so long as the button remains not pressed. When the button is pressed, then, step 91, the user interface procedure communicates through the display manager 72 (FIG. 7) to remove the menu item MOVE SCREEN from the display and to, step 92, proceed with the selected MOVE SCREEN function. Upon the completion of the MOVE SCREEN function, the normal cursor is again displayed, step 93, and the system is returned to step 81. More specific details of user interface routine hereinabove described with respect to FIG. 10 is set forth below in PL1-like pseudo code.

```
USER_INTERFACE: procedure;
! initialize user interface and echo management
DO WHILE ( forever );
! receive an x/y delta from the mouse device driver
call wait_for_mouse(delta_x, delta_y, button);
! update coordinates at which cursor would be
!!echoed
cursor_x = cursor_x + delta_x; cursor_y = cursor_y
+ delta_y;
! check location of new cursor coordinates
Sel_Area = inside(cursor_x, cursor_y, scrx1,scry1,
scrx2,scry2,scrx1+5,scry1+5,scrx2-5,scry2-5);
/* assumes peripheral region size is 5 */
SELECT ! on basis of where cursor would be echoed
( Sel_Area );
WHEN ! cursor is inside a screen boundary or
!! leaving via normal exit with no event
!! detected
( 0,1,2,3,4 )
! echo cursor at specified location
DO;
call show_cursor(cursor_x, cursor_y,
normal_cursor);
END DO;
WHEN ! cursor is leaving via upper left top event
!! boundary (MOVE SCREEN)
( 5 )
! do not show cursor, show move screen icon and
!! wait for click or motion back into screen
DO WHILE ( forever );! until user commits to item
!! or returns to inside
! show the move screen icon at a fixed position
!! relative to the upper left corner of the
!! screen
call show_cursor(move_ul_x, move_ul_y,
move_screen_icon);
! receive an x/y delta from the mouse device
!! driver
call wait_for_mouse(delta_x, delta_y, button);
! update coordinates at which cursor would be
!! echoed
cursor_x = cursor_x + delta_x; cursor_y =
cursor_y + delta_y;
IF ! new coordinate is back inside
0 = inside(cursor_x, cursor_y, scrx1,
scry1,scrx2,scry2,scrx1+5,scry1+5,
scrx2-5,scry2-5);
THEN ! reshow normal cursor return to main echo
!! loop
DO;
call show_cursor(cursor_x, cursor_y,
normal_cursor);
LEAVE;
END DO;
IF ! button has been pressed on mouse
button
THEN ! remove cursor and perform screen
!! movement then return to main echo loop
DO;
```

```
-continued call show__cursor(cursor__x, cursor__y,
no-cursor);
call move__screen(screen__id); /* process
this menu item */
call show__cursor(cursor__x, cursor__y,
normal__cursor);
LEAVE;
END DO;
END DO WHILE;
WHEN ! one of the other event detection
!! conditions are returned
( 6,7,8,9,10,11,12)
! perform the distributed menu action desired
!! as above
DO;
/* similar to when (5) above with desired
distributed menu functions implemented
instead of move screen */
END DO;
END SELECT;
END DO WHILE;
END PROCEDURE USER__INTERFACE;
```

While the invention has been particularly shown and described with reference to a preferred embodiment it will be understood by those skilled in the art that various other changes in form and detail may be made without departing from the spirit and scope of the invention.

We claim:

1. In an interactive display terminal comprising a display screen having at least one window having lesser dimensions than said display screen and displaying subject matter different from that displayed on the remainder of the screen, the improvement wherein said display further comprises a virtual menu comprising a plurality of items respectively distributed about the periphery of said window and not displayed in normal operations, cursor means on said screen, means for moving said cursor, and means responsive to the movement of said cursor across selected regions in said periphery for displaying selected menu items respectively associated with said regions.

2. The display terminal of claim 1 wherein said window has a rectangular periphery and said selected regions are adjacent to at least one corner of said periphery.

3. The display terminal of claim 2 wherein two of said selected regions are respectively positioned on both sides of one corner of said periphery.

4. The display terminal of claim 2 wherein said menu items are positioned adjacent to their respective associated periphery regions.

5. The display terminal of claim 1 wherein each menu item represents a function to be performed with respect to the subject matter displayed within the window.

6. The display terminal of claim 2 wherein each menu item represents a function to be performed with respect to the subject matter displayed within the window.

7. The display terminal of claim 5 further including means for activating said represented function concurrently with the display of said menu item.

8. In an interactive display terminal comprising a display screen having formed thereon plurality of overlapping windows, each window having smaller dimensions than said screen and displaying subject matter different from that displayed on the remainder of the screen, the improvement wherein said display screen further comprises at least one virtual menu comprising a plurality of items respectively distributed about the periphery of one of said windows and not displayed in normal operations, cursor means on said screen, means for moving said cursor, and means responsive to the movement of said cursor across selected regions in said periphery for displaying selected items respectively associated with said regions.

9. The display terminal of claim 8 wherein said one window has a rectangular periphery and said selected regions are adjacent to at least one corner of said periphery.

10. The display terminal of claim 9 wherein said menu items are positioned adjacent to their respective associated periphery regions.

11. The display terminal of claim 9 wherein each menu item represents a function to be performed with respect to the subject matter displayed within said one window.

12. The display terminal of claim 9 wherein said function involves moving said one window and said apparatus further includes means for moving said one window to diminish window overlap and thereby expose more of the subject matter in at least one of said windows.

* * * * *